US012679115B2

(12) United States Patent
Toyama et al.

(10) Patent No.: US 12,679,115 B2
(45) Date of Patent: Jul. 14, 2026

(54) PRINTING DEVICE AND PRINTING METHOD

(71) Applicant: SEIKO EPSON CORPORATION, Tokyo (JP)

(72) Inventors: Hiroshi Toyama, Shiojiri (JP); Satoru Katagami, Matsumoto (JP); Yuichi Washio, Shiojiri (JP); Kazutoshi Fujisawa, Okaya (JP); Ko Takanashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 252 days.

(21) Appl. No.: 18/545,376

(22) Filed: Dec. 19, 2023

(65) Prior Publication Data

US 2024/0208246 A1 Jun. 27, 2024

(30) Foreign Application Priority Data

Dec. 23, 2022 (JP) ................................ 2022-207225

(51) Int. Cl.
*B41J 11/00* (2006.01)
*B41M 7/00* (2006.01)

(52) U.S. Cl.
CPC .... *B41J 11/00222* (2021.01); *B41J 11/00242* (2021.01); *B41M 7/009* (2013.01)

(58) Field of Classification Search
CPC ................ B41J 11/002; B41J 11/00222; B41J 11/00242
USPC .......................................................... 347/102
See application file for complete search history.

(56) References Cited

U.S. PATENT DOCUMENTS 10,525,738 B2 1/2020 Katagami et al.
10,723,119 B2 * 7/2020 Hoshino ............. B41F 23/0466
11,173,727 B2 11/2021 Toyama et al.
2022/0288928 A1 * 9/2022 Uda ........................ B41J 11/002

FOREIGN PATENT DOCUMENTS

JP 2018-130900 A 8/2018
JP 2020168771 A * 10/2020
JP 2020-199660 A 12/2020

OTHER PUBLICATIONS

JP 2020168771 A machine translation (Year: 2025).*

* cited by examiner

*Primary Examiner* — Stephen D Meier
*Assistant Examiner* — Thomas Ray Knief
(74) *Attorney, Agent, or Firm* — WORKMAN NYDEGGER

(57) ABSTRACT

A printing device 1 includes a setting section 2 of a print medium P; a winding section 5 configured to wind up the print medium P; a print head 3 configured to form an image by ejecting ink onto the print medium P; and a drying furnace 10 configured to dry the ink ejected onto the print medium P, wherein the drying furnace 10 includes a blowing heating section 20 for blowing heated gas G to the image forming surface P1, the blowing heating section 20 has a first blowing heating section 20A and a second blowing heating section 20B, a print mode includes a first mode and a second mode, and the airflow speed of gas G blown by the first blowing heating section 20A in the second mode is slower than the airflow speed of gas G blown by the first blowing heating section 20A in the first mode.

11 Claims, 7 Drawing Sheets

PRINTING DEVICE AND PRINTING METHOD

The present application is based on, and claims priority from JP Application Serial Number 2022-207225, filed Dec. 23, 2022, the disclosure of which is hereby incorporated by reference herein in its entirety.

BACKGROUND

1. Technical Field

The present disclosure relates to a printing device and a printing method.

2. Related Art

In the related art, various printing devices that perform printing by ejecting ink onto a print medium are used. Among these, there is a printing device that is provided with a heating section that heats the print medium and that is capable of drying the ink that was ejected onto the print medium. For example, JP-A-2018-130900 discloses a printing device including a drying section (heating section) that heats a medium (print medium) by blowing hot air onto the surface of the medium.

Various types of printing medium are used. For example, as the print medium, there are cases where a label paper sheet or the like is used in which the image forming surface of the print medium is formed of film. For example, when the printing medium such as a label paper sheet having an image forming surface formed of film is dried using a printing device that includes a heating section that blows hot air to the surface of the printing medium to heat the surface, for example, there are cases where the surface condition changes, for example unevenness in the drying speed of ink ejected onto the image forming surface caused by unevenness in hot air blown on portions that hot air hits directly and portions that hot air does not hit directly, resulting in unevenness in the glossiness of the image forming surface.

SUMMARY

A printing device according to the present disclosure for solving the above problem includes a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section, which is disposed downstream of the first blowing heating section in the transport direction, a print mode for forming the image on the print medium includes a first mode and a second mode, and the airflow speed of gas blown by the first blowing heating section in the second mode is slower than the airflow speed of gas blown by the first blowing heating section in the first mode.

Another printing device according to the present disclosure for solving the above problem includes a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, a print mode for forming the image on the print medium includes a first mode and a second mode, the airflow speed of gas blown by the blowing heating section in the second mode is lower than the airflow speed of gas blown by the blowing heating section in the first mode, and the temperature of gas blown by the blowing heating section in the second mode is higher than the temperature of gas blown by the blowing heating section in the first mode.

A printing method of the printing device according to the present disclosure for solving the above described problem, the printing device including a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section, which is disposed downstream of the first blowing heating section in the transport direction, and a print mode for forming the image on the print medium includes a first mode and a second mode, the method includes making the airflow speed of gas blown by the first blowing heating section in the second mode to be slower than the airflow speed of gas blown by the first blowing heating section in the first mode.

DESCRIPTION OF EMBODIMENTS

Figure 1:
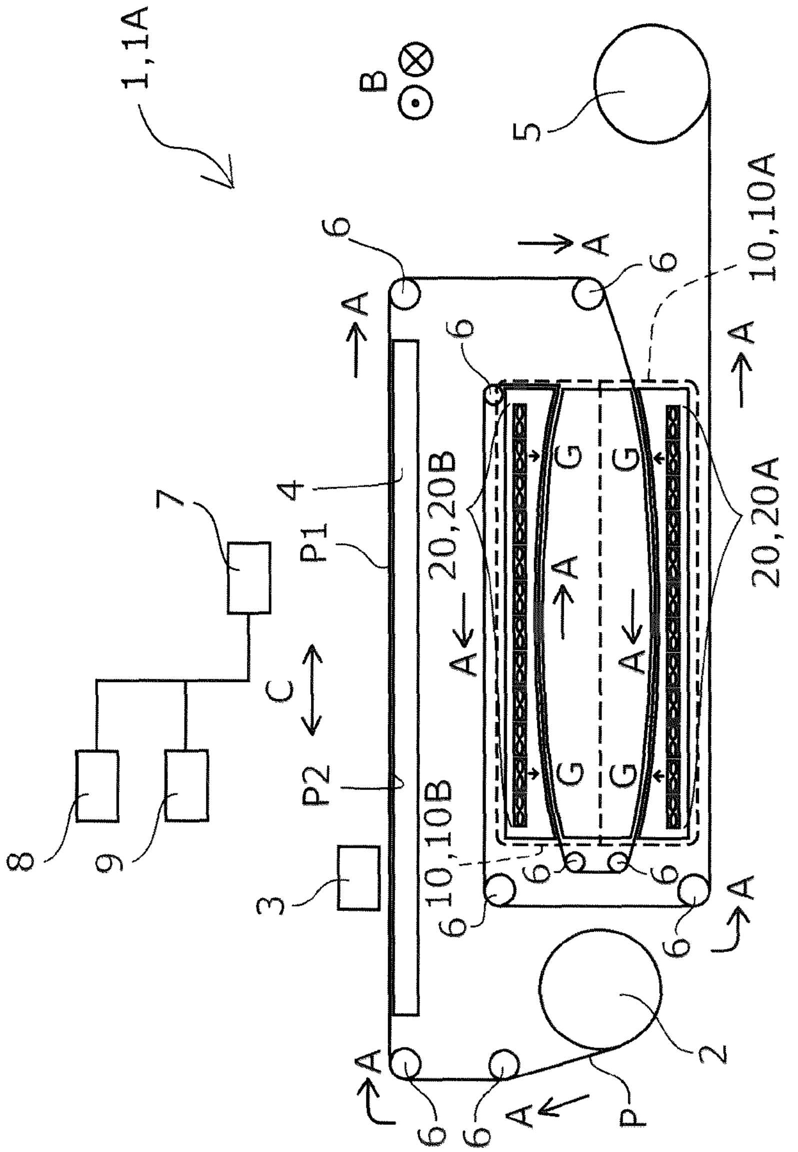
FIG. 1 is a schematic side view of a printing device according to a first embodiment of the present disclosure.

First, the present disclosure will be schematically described.

A printing device according to first aspect of the present disclosure for solving the above described problem includes a setting section configured to set a roll-like print medium;

a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section, which is disposed downstream of the first blowing heating section in the transport direction, a print mode for forming the image on the print medium includes a first mode and a second mode, and the airflow speed of gas blown by the first blowing heating section in the second mode is slower than the airflow speed of gas blown by the first blowing heating section in the first mode.

According to the present aspect, the airflow speed of gas blown by the first blowing heating section in the second mode is slower than the airflow speed of gas blown by the first blowing heating section in the first mode. That is, there is a second mode in which the airflow speed of the blown gas is low. By reducing the airflow speed of gas being blown, even when a portion directly hit by gas and a portion not directly hit by gas are generated, the unevenness of the drying speed of the ink can be reduced. For this reason, by selecting the second mode when using a print medium in which the surface condition easily changes, it is possible to suppress the occurrence of unevenness the glossiness of the image forming surface, and it is possible to suppress changes in the surface condition of the print medium.

A second aspect of the present disclosure is an aspect according to the first aspect, wherein the airflow speed of gas blown by the second blowing heating section in the second mode is faster than the airflow speed of gas blown by the first blowing heating section in the second mode.

Of the front side in the transport direction of the print medium and the rear side in the transport direction of the print medium, the surface condition of the print medium is more likely to change on the front side in the transport direction of the print medium. However, according to the present aspect, the airflow speed of gas blown by the second blowing heating section in the second mode is faster than the airflow speed of gas blown by the first blowing heating section in the second mode. That is, in the second mode, the airflow speed of gas blown to the print medium on the upstream side in the transport direction is made slower, and the airflow speed of gas blown to the print medium on the downstream side in the transport direction is made faster. By doing so, it is possible to sufficiently dry the print medium as a whole by increasing the drying efficiency by increasing the airflow speed of gas blown onto the print medium in the region where the surface condition is unlikely to change, which corresponds to the downstream side in the transport direction, while suppressing change in the surface condition of the print medium in the region where the surface condition is likely to change, which corresponds to the upstream side in the transport direction.

A third aspect of the present disclosure is an aspect according to the second aspect, wherein the airflow speed of gas blown by the second blowing heating section in the second mode is faster than the airflow speed of gas blown by the second blowing heating section in the first mode.

According to the present aspect, the airflow speed of gas blown by the second blowing heating section in the second mode is faster than the airflow speed of gas blown by the second blowing heating section in the first mode. For this reason, in the second mode, in which the drying efficiency tends to decrease, it is possible to sufficiently dry the print medium as a whole by increasing the drying efficiency by particularly increasing the airflow speed of gas blown onto the print medium in the region corresponding to the downstream side in the transport direction, which is where the surface condition is unlikely to change.

A fourth aspect of the present disclosure is an aspect according to the second aspect, wherein the temperature of gas blown by the second blowing heating section in the second mode is higher than the temperature of gas blown by the second blowing heating section in the first mode.

According to the present aspect, the temperature of gas blown by the second blowing heating section in the second mode is higher than the temperature of gas blown by the second blowing heating section in the first mode. For this reason, in the second mode in which the drying efficiency tends to decrease, it is possible to sufficiently dry the print medium as a whole by increasing the drying efficiency by increasing the temperature of gas blown onto the print medium in the region corresponding to the downstream side in the transport direction, which is where the surface condition is unlikely to change.

A printing device according to a fifth aspect of the present disclosure includes a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, a print mode for forming the image on the print medium includes a first mode and a second mode, the airflow speed of gas blown by the blowing heating section in the second mode is lower than the airflow speed of gas blown by the blowing heating section in the first mode, and the temperature of gas blown by the blowing heating section in the second mode is higher than the temperature of gas blown by the blowing heating section in the first mode.

According to the present aspect, the airflow speed of gas blown by the blowing heating section in the second mode is lower than the airflow speed of gas blown by the blowing heating section in the first mode, and the temperature of gas blown by the blowing heating section in the second mode is higher than the temperature of gas blown by the blowing heating section in the first mode. By decreasing the airflow speed of gas to be blown and decreasing the temperature of gas to be blown, it is possible to reduce unevenness in ink drying speed even when there are portions directly hit by gas and not directly hit by gas. For this reason, by selecting the second mode when using a print medium in which the surface condition easily changes, it is possible to suppress the occurrence of unevenness in the glossiness of the image forming surface, and it is possible to suppress changes in the surface condition of the print medium. In the second mode, it is possible to sufficiently dry the print medium as a whole by increasing the drying efficiency by increasing the temperature of gas blown by the blowing heating section.

A sixth aspect of the present disclosure is an aspect according to any one of the first to fifth aspects, and further includes a storage section configured to store a table of print modes corresponding to combinations of amounts of ink to be used and types of print medium to be used; an input section configured to enable input of the amount of ink to be used and the type of print medium to be used; and a print mode setting section configured to set the print mode based on the table in accordance with information input from the input section.

According to the present aspect, the printing device includes the storage section configured to store a table of the print mode determined in accordance with a combination of the amount of ink to be used and the type of print medium to be used, the input section configured to enable input the amount of ink to be used and the type of print medium to be used, and the print mode setting section configured to set the print mode based on the table in accordance with information input from the input section. Therefore, a user can appropriately and easily set the print mode in accordance with the print medium to be used.

A seventh aspect of the present disclosure is an aspect according to the sixth aspect, wherein the print mode setting section is configured to, when the amount of ink to be used is less than 8.0 mg/inch$^2$, set the print mode to the first mode regardless of the type of print medium to be used.

When the amount of ink to be used is less than 8.0 mg/inch$^2$, the amount of ink used is small, and thus the surface condition of the printing medium is unlikely to change. However, according to the present aspect, when the amount of ink to be used is less than 8.0 mg/inch$^2$, the print mode setting section sets the print mode to the first mode, regardless of the type of print medium to be used. Therefore, it is possible to avoid intentionally selecting the second mode when the surface condition of the print medium is unlikely to change.

An eighth aspect of the present disclosure is an aspect according to the sixth aspect, wherein the print mode setting section is configured to, when the amount of ink to be used is equal to or greater than 10.0 mg/inch$^2$, set the print mode to the second mode regardless of the type of print medium to be used.

When the amount of ink to be used is greater than or equal to 10.0 mg/inch$^2$, the amount of ink to be used is large, and therefore, the surface condition of the print medium is likely to change. However, according to the present aspect, when the amount of ink to be used is greater than or equal to 10.0 mg/inch$^2$, the print mode is set to the second mode regardless of the type of print medium to be used. Therefore, it is possible to avoid erroneously selecting the first mode when the surface condition of the print medium is likely to change.

A ninth aspect of the present disclosure is an aspect according to the sixth aspect, wherein the print mode setting section is configured to, when the amount of ink to be used is less than 8.0 mg/inch$^2$ and equal to or greater than 10.0 mg/inch$^2$, set the print mode to the first mode when the material of the image forming surface of the print medium to be used is paper and set the print mode to second mode when the material of the image forming surface of the print medium to be used is a film.

The surface condition of the print medium in which the material of the image forming surface is paper is unlikely to change and the surface condition of the print medium in which the material of the image forming surface is film is likely to change. However, according to the present aspect, when the amount of ink to be used is less than 8.0 mg/inch$^2$ and equal to or greater than 10.0 mg/inch$^2$, the print mode is set to the first mode when the material of the image forming surface of the printing medium to be used is paper, and the print mode is set to the second mode when the material of the image forming surface of the printing medium to be used is film. Therefore, when the amount of ink to be used is less than 8.0 mg/inch$^2$ and equal to or greater than 10.0 mg/inch$^2$, it is possible to avoid intentionally selecting the second mode when the surface condition of the print medium is unlikely to change because the material of the image forming surface is paper, and it is possible to avoid erroneously selecting the first mode when the surface condition of the print medium is likely to change because the material of the image forming surface is film.

A tenth aspect of the present disclosure is an aspect according to any one of the first to fifth aspects, and further includes a contact heating section configured to heat the print medium by contacting a surface of the print medium opposite to the image forming surface.

According to the present aspect, it includes the contact heating section configured to heat the print medium by contacting the surface opposite to the image forming surface of the print medium. For this reason, it is possible to heat the print medium from the opposite surface, which is opposite to the image forming surface, and it is possible to particularly effectively dry the ink that is ejected onto the image forming surface while suppressing a change in the surface condition of the print medium.

A printing method of an eleventh aspect of the present disclosure, the printing device including a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section disposed downstream of the first blowing heating section in the transport direction, and a print mode for forming the image on the print medium includes a first mode and a second mode, the method includes making the airflow speed of gas blown by the first blowing heating section in the second mode to be slower than the airflow speed of gas blown by the first blowing heating section in the first mode.

According to the present aspect, the airflow speed of gas blown by the first blowing heating section in the second mode is slower than the airflow speed of gas blown by the first blowing heating section in the first mode. That is, in the second mode, the airflow speed of the blown gas is low. By reducing the airflow speed of gas being blown, even when a portion directly hit by gas and a portion not directly hit by gas are generated, the unevenness of the drying speed of the ink can be reduced. For this reason, by selecting the second mode when using a print medium in which the surface condition easily changes, it is possible to suppress the occurrence of unevenness in the glossiness of the image forming surface, and it is possible to suppress changes in the surface condition of the print medium.

A printing method of a twelfth aspect of the present disclosure, the printing device including a setting section configured to set a roll-like print medium; a winding section configured to wind up the print medium transported from the setting section; a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface and a print mode for forming the image on the print medium includes a first mode and a second mode, the method includes making the airflow speed of gas blown by the blowing heating section in the second mode lower than the airflow speed of gas blown by the blowing heating section in the first mode and making the temperature of gas blown by the blowing heating section in the second mode higher than the temperature of gas blown by the blowing heating section in the first mode.

According to the present aspect, the airflow speed of gas blown by the blowing heating section in the second mode is lower than the airflow speed of gas blown by the blowing heating section in the first mode, and the temperature of gas blown by the blowing heating section in the second mode is higher than the temperature of gas blown by the blowing heating section in the first mode. By decreasing the airflow speed of gas to be blown and decreasing the temperature of gas to be blown, it is possible to reduce unevenness in ink drying speed even when there are portions directly hit by gas and not directly hit by gas. For this reason, by selecting the second mode when using a print medium in which the surface condition easily changes, it is possible to suppress the occurrence of unevenness in the glossiness of the image forming surface, and it is possible to suppress changes in the surface condition of the print medium. In the second mode, it is possible to sufficiently dry the print medium as a whole by increasing the drying efficiency by increasing the temperature of gas blown by the blowing heating section.

First Embodiment

Hereinafter, embodiments according to the present disclosure will be described in detail with reference to the drawings. First, an overview of a printing device 1A according to a first embodiment as an example of a printing device 1 of the present disclosure will be described with reference to FIG. 1. As shown in FIG. 1, the printing device 1A of the present embodiment includes a setting section 2 that sets a roll-like print medium P, a winding section 5 that winds up the print medium P transported from the setting section 2, and a print head 3 that forms an image by ejecting ink onto an image forming surface P1 of the print medium P that is transported in a transport direction A in a transport path from the setting section 2 to the winding section 5. The printing device 1A of the present embodiment includes a platen 4 that supports the printing medium P in an image forming region in which the image is formed by the print head 3 and includes a plurality of transport rollers 6, as a transport section of the printing medium P, that are provided in the transport path of the printing medium P. Furthermore, the printing device 1A of the present embodiment includes a control section 7 having a CPU, a storage section, and the like, and each constituent member of the printing device 1A of the present embodiment is driven by the control of the control section 7.

The print head 3 is provided on a side facing the image forming surface P1 of the print medium P transported in the transport direction A, and forms an image by ejecting ink onto the image forming surface P1 that is in a state of the opposite surface P2, which is on the opposite side of the print medium P from the image forming surface P1, being supported by the platen 4. In detail, the printing device 1A of the present embodiment performs printing by reciprocating the print head 3 in a scanning direction C along the transport direction A. More specifically, the printing device 1A according to the present embodiment intermittently drives (intermittently transports) the print medium P in the transport direction A, reciprocates the print head 3 in the scanning direction C, and ejects ink from the print head 3 to perform printing.

Note that the print head 3 of the present embodiment can complete image formation of the entire image forming region of the image forming surface P1 supported by the platen 4 in a single scanning (a single pass) and can also complete the image formation by scanning the entire image forming region a plurality of times (a plurality of passes). As a matter of course, when the image formation is completed in a plurality of passes, the transport stop time of the print medium P according to intermittent transport is longer than when the image formation is completed in a single pass.

As described above, the print head 3 of the present embodiment is configured to perform printing by reciprocating in the scanning direction C along the transport direction A. However, the configuration of the print head 3 is not particularly limited. Instead of the print head 3 that performs printing by reciprocating in the scanning direction C along the transport direction A, a print head 3 may be provided that performs printing by reciprocating in a width direction B, which intersects the transport direction A, or a so-called line head may be provided, the line head being provided with nozzles arranged in the width direction B for ejecting ink across the entire print medium P in the width direction B and that performs printing in a state in which the print head is stopped.

As shown in FIG. 1, a drying furnace 10 for drying ink that was ejected onto the print medium P is provided in the transport path of the print medium P, further downstream in the transport direction A than the print head 3. As described above, the printing device 1A according to the present embodiment includes the setting section 2 that sets the roll-like print medium P, the winding section 5 that winds the print medium P transported from the setting section 2, the print head 3 that forms images by ejecting ink onto the image forming surface P1 of the transported print medium P, and the drying furnace 10 that is disposed downstream of the print head 3 in the transport direction A in the transport path of the print medium P and that dries the ink ejected onto the print medium P.

Here, the printing device 1A of the present embodiment is configured to be able to use various types of printing medium P. The print mode for forming the image on the print medium P can be changed in accordance with the type of the print medium P to be used. To be specific, the printing device 1A of the present embodiment has a first mode and a second mode as print modes, and when the user selects the type of the printing medium P to be used via a user interface of a PC 9 or an operation panel 8 provided in the printing device 1A, the information is input to the control section 7, and the control section 7 sets the print mode to either the first mode or the second mode.

Hereinafter, the drying furnace 10, which is a main section of the printing device 1A of the present embodiment, will be described in detail. As shown in FIG. 1, the printing device 1A of the present embodiment has a first drying furnace 10A and a second drying furnace 10B as the drying furnaces 10. Here, the drying furnace 10 has a blowing heating section 20 for blowing heated gas G to the image forming surface P1. More specifically, the printing device 1A of the present embodiment has the first blowing heating section 20A and the second blowing heating section 20B as the blowing heating section 20, in which the first blowing heating section 20A is provided in the first drying furnace 10A, and the second blowing heating section 20B is provided in the second drying furnace 10B. In other words, the second blowing heating section 20B is disposed downstream of the first blowing heating section 20A in the transport direction A. Note that as the blowing heating section 20, for example, a fan capable of blowing hot air can be used.

Here, as described above, the printing device 1A of the present embodiment has the first mode and the second mode as the print mode for forming the image on the printing medium P. Hereinafter, an example of a printing method performed using the printing device 1A of the present embodiment including a specific embodiment of the setting of the print mode will be described with reference to the flowchart of FIG. 2.

To start printing, the user first selects the print medium P to be used via the PC 9, the operation panel 8 provided in the printing device 1A, or the like in a print mode setting step of step S110. Note that the printing device 1A of the present embodiment can use various print medium P such as print medium P having a paper image forming surface P1 and print medium P having a film image forming surface P1. In accordance with the selection of the print medium P by the user, the control section 7 sets the print mode to either the first mode or the second mode.

Here, in the printing method of the present embodiment, the print mode is set in accordance with whether the image forming surface P1 is paper or film, or the amount of ink used for printing. The amount of ink used in the present embodiment is defined by the number of grams of ink ejected per 1 $inch^2$ as a unit area of the image forming surface P1. Specifically, the print mode is set corresponding to the following Table 1. Note that a table corresponding to Table 1 is stored in the storage section included in the control section 7.

TABLE 1

| INK AMOUNT | IMAGE FORMING SURFACE OF PRINT MEDIUM | |
|---|---|---|
| ($mg/inch^2$) | PAPER | FILM |
| LESS THAN 8.0 | FIRST MODE | FIRST MODE |
| 8.0 OR MORE AND LESS THAN 10.0 | FIRST MODE | SECOND MODE |
| 10.0 OR MORE | SECOND MODE | SECOND MODE |

Next, in a gas temperature setting step of step S120, the temperature of gas G to be blown by the blowing heating section 20 is set. Here, in the printing method of the present embodiment, when the print mode is set to the first mode in the print mode setting step of step S110, the temperature of gas G blown by the blowing heating section 20 is set to 95° C. in both the first blowing heating section 20A and the second blowing heating section 20B. Also when the print mode is set to the second mode in the print mode setting step of step S110, the temperature of gas G blown by the blowing heating section 20 is set to 95° C. in both the first blowing heating section 20A and the second blowing heating section 20B.

Next, in an airflow speed setting step of step S140, the airflow speed of gas G blown by the blowing heating section 20 is set. Here, in the printing method of the present embodiment, when the print mode is set to the first mode in the print mode setting step of step S110, the airflow speed of gas G blown by the blowing heating section 20 is set to 10 m/s in both the first blowing heating section 20A and the second blowing heating section 20B. On the other hand, when the print mode is set to the second mode in the print mode setting step of step S110, the airflow speed of gas G blown by the blowing heating section 20 is set to 5 m/s in the first blowing heating section 20A, and is set to 20 m/s in the second blowing heating section 20B.

Figure 2:
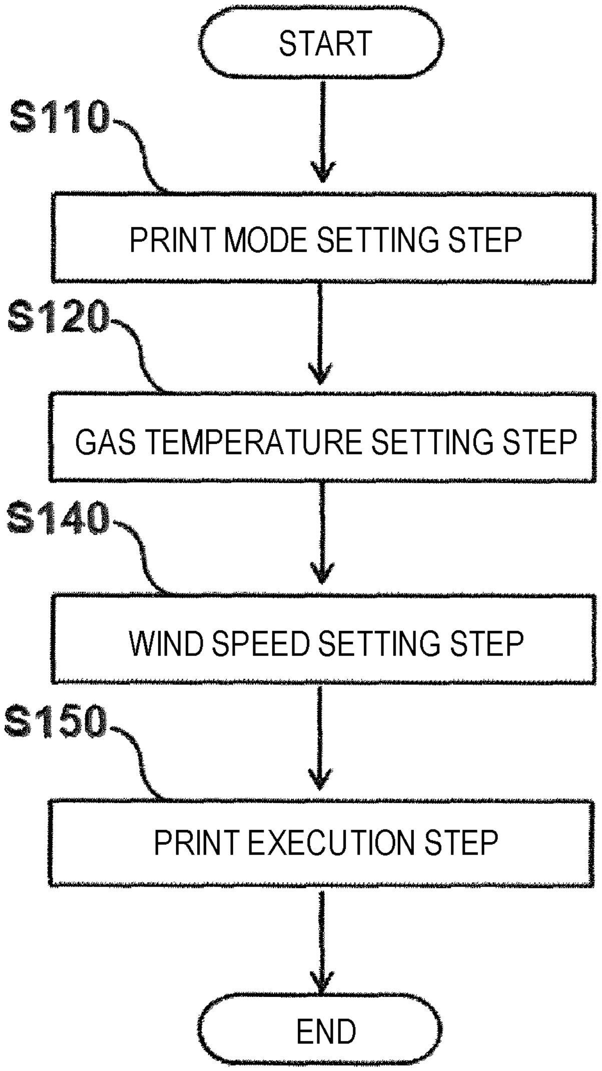
FIG. 2 is a flow chart of an example of a printing method performed using the printing device of FIG. 1.

Here, the gas temperature setting step of step S120 and the airflow speed setting step of step S140 need not be performed in the order of the flowchart of FIG. 2, but may be performed in a different order or may be performed simultaneously. Note that in the present embodiment, the items set in the gas temperature setting step of step S120 and the airflow speed setting step of step S140 are summarized as shown in Table 2 below.

TABLE 2

| PRINT MODE | BLOWING HEATING SECTION | GAS TEMPERATURE(° C.) | AIRFLOW SPEED(m/s) |
|---|---|---|---|
| FIRST MODE | FIRST BLOWING HEATING SECTION | 95 | 10 |
| | SECOND BLOWING HEATING SECTION | 95 | 10 |
| SECOND MODE | FIRST BLOWING HEATING SECTION | 95 | 5 |
| | SECOND BLOWING HEATING SECTION | 95 | 20 |

Next, in the printing execution step of step S150, the print medium P is transported in the transport direction A and ink is ejected from the print head 3 to form a desired image on the image forming surface P1. Then, the desired image is formed on the image forming surface P1, and the printing method of the present embodiment is ended.

As can be seen from Table 2, in the printing method of the present embodiment, the airflow speed (5 m/s) of gas G blown by the first blowing heating section 20A in the second mode is slower than the airflow speed (10 m/s) of gas G blown by the first blowing heating section 20A in the first mode. That is, the printing device 1A of the present embodiment has the second mode in which the airflow speed of gas G to be blown is low. By reducing the airflow speed of gas G to be blown, even when there are both portions directly hit by gas G and not directly hit by gas G, it is possible to reduce unevenness of the drying speed of the ink. For this reason, in the printing device 1A of the present embodiment, by selecting the second mode when using the printing medium P of which the surface condition easily changes, it is possible to suppress the occurrence of unevenness in the glossiness of the image forming surface P1, and it is possible to suppress the surface condition of the printing medium P from changing.

As can be seen from Table 2, in the printing device 1 of the present embodiment, it is possible to make the airflow speed (20 m/s) of gas G blown by the second blowing heating section 20B in the second mode faster than the airflow speed (5 m/s) of gas G blown by the first blowing heating section 20A in the second mode. On the front side and the rear side in the transport direction A of the print medium P, the surface condition of the print medium P is more likely to change on the front side in the transport direction A of the print medium P. However, as in the printing method of the present embodiment, the airflow speed of gas G blown by the second blowing heating section 20B in the second mode is set to be higher than the airflow speed of gas G blown by the first blowing heating section 20A in the second mode, that is, in the second mode, it is possible to sufficiently dry the print medium P while suppressing a change in the surface condition of the print medium P by decreasing the airflow speed of gas G blown onto the print medium P on the upstream side in the transport direction A of the print medium P and increasing the airflow speed of gas G blown onto the print medium P on the downstream side in the transport direction A of the print medium P. Specifically, it is possible to sufficiently dry the print medium P as a whole by increasing the drying efficiency by increasing the airflow speed of gas G blown onto the print medium P in the region in which the surface condition is unlikely to change, which corresponds to the downstream side in the transport direction A of the print medium P, while suppressing the surface condition of the print medium P from changing in the region in which the surface condition is likely to change, which corresponds to the upstream side in the transport direction A of the print medium P.

As can be seen from Table 2, in the printing device 1 of the present embodiment, the airflow speed (20 m/s) of gas G blown by the second blowing heating section 20B in the second mode can be made faster than the airflow speed (10 m/s) of gas G blown by the second blowing heating section 20B in the first mode. By setting such a drying condition, in the second mode in which the drying efficiency tends to decrease, it is possible to sufficiently dry the print medium P as a whole by increasing the drying efficiency by particularly increasing the airflow speed of gas G blown onto the print medium P in the region corresponding to the downstream side in the transport direction A of the print medium P, where the surface condition is unlikely to change.

As described above, the printing device 1A of the present embodiment that includes the control section 7 having the storage section which stores the table corresponding to Table 1, of print modes determined corresponding to the combination of the use amount of ink and the type of the printing medium P to be used and includes the operation panel 8 as the input section which enables input of the use amount of ink and the type of the printing medium P to be used. The control section 7 also serves as a print mode setting section that sets the print mode based on the table corresponding to Table 1, in accordance with information input from the input section such as the operation panel 8. Since the printing device 1A of the present embodiment has such a configuration, the user can appropriately and easily set the print mode according to the printing medium P to be used.

As shown in Table 1, in the printing device 1A of the present embodiment, the control section 7 as the print mode setting section can set the print mode to the first mode when the use amount of ink is less than 8.0 mg/inch$^2$, regardless of the type of the print medium P to be used. When the amount of ink used is less than 8.0 mg/inch$^2$, the amount of ink used is small, so that the surface condition of the print medium P is unlikely to change. Therefore, when the amount of ink used is less than 8.0 mg/inch$^2$, the print mode is set to the first mode regardless of the type of the print medium P to be used, whereby it is possible to avoid intentionally selecting the second mode when the surface condition of the print medium P is unlikely to change.

As shown in Table 1, in the printing device 1A of the present embodiment, the control section 7 can set the print mode to the second mode when the use amount of ink is equal to or greater than 10.0 mg/inch$^2$, regardless of the type of the printing medium P to be used. When the amount of ink used is equal to or greater than 10.0 mg/inch$^2$, the amount of ink used is large, so that the surface condition of the print medium P is likely to change. However, when the amount of ink used is equal to or greater than 10.0 mg/inch$^2$, the print mode is set to the second mode regardless of the type of the print medium P to be used, whereby it is possible to avoid erroneously selecting the first mode when the surface condition of the print medium P is liable to change.

As shown in Table 1, in the printing device 1A of the present embodiment, when the amount of ink used is less than 8.0 mg/inch$^2$ and 10.0 mg/inch$^2$ or more, the control section 7 can set the print mode to the first mode when the material of the image forming surface P1 of the print medium P to be used is paper, and can set the print mode to the second mode when the material of the image forming surface P1 of the print medium P to be used is film. The surface condition of the print medium P in which the material of the image forming surface P1 is paper is unlikely to change, and the surface condition of the print medium P whose material of the image forming surface P1 is film is likely to change. However, as described above, when the amount of ink to be used is less than 8.0 mg/inch$^2$ and 10.0 mg/inch$^2$ or more, then the printing device 1A of the present embodiment can set the print mode to the first mode when the material of the image forming surface P1 of the printing medium P to be used is paper, and can set the print mode to the second mode when the material of the image forming surface P1 of the printing medium P to be used is film. Therefore, when the amount of ink used is less than 8.0 mg/inch$^2$ and 10.0 mg/inch$^2$ or more, the printing device 1A of the present embodiment can avoid intentional selection of the second mode when the material of the image forming surface P1 is paper and the surface condition of the print medium P is unlikely to change, and can avoid erroneous selection of the first mode when the material of the image forming surface P1 is a film and the surface condition of the print medium P is likely to change.

Note that in the printing device 1A of the present embodiment, the gas temperature and the airflow speed can be set under conditions different from those of Table 2 in the gas temperature setting step of step S120 and the airflow speed setting step of step S140. The respective items set under the conditions of an example different from Table 2 are, for example, as summarized in Table 3 shown below.

TABLE 3

| PRINT MODE | BLOWING HEATING SECTION | GAS TEMPERATURE(° C.) | AIRFLOW SPEED(m/s) |
|---|---|---|---|
| FIRST MODE | FIRST BLOWING HEATING SECTION | 95 | 10 |
| | SECOND BLOWING HEATING SECTION | 95 | 10 |
| SECOND MODE | FIRST BLOWING HEATING SECTION | 95 | 5 |
| | SECOND BLOWING HEATING SECTION | 105 | 10 |

As shown in Table 3, in the printing device 1A of the present embodiment, the temperature (105° C.) of gas blown by the second blowing heating section 20B in the second mode can be higher than the temperature (95° C.) of gas blown by the second blowing heating section 20B in the first mode. Even by setting such a drying condition, in the second mode in which the drying efficiency tends to decrease, it is possible to sufficiently dry the print medium P as a whole by increasing the drying efficiency by increasing the temperature of gas G blown onto the print medium P in the region corresponding to the downstream side in the transport direction A of the print medium P in which the surface condition is unlikely to change. Note that in Table 3, the airflow speed of gas blown by the second blowing heating section 20B in the second mode is aligned with the airflow speed of gas blown by the second blowing heating section 20B in the first mode, but as in the case of Table 2, the airflow speed of gas blown by the second blowing heating section 20B in the second mode may be higher than the airflow speed of gas blown by the second blowing heating section 20B in the first mode.

Second Embodiment

Figure 3:
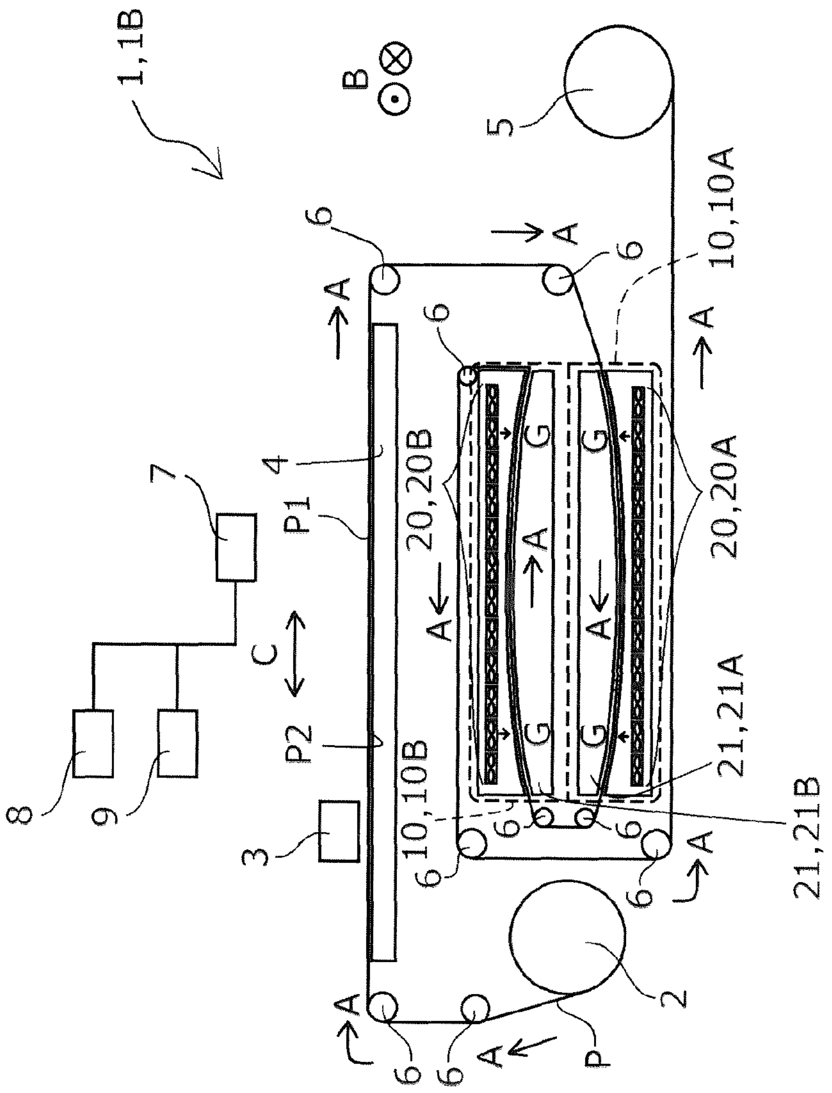
FIG. 3 is a schematic side view of a printing device according to a second embodiment of the present disclosure.

Next, a printing device 1B according to a second embodiment will be described with reference to FIGS. 3 and 4. Note that FIG. 3 is a diagram corresponding to FIG. 1 of the printing device 1 in the first embodiment. In FIG. 3, constituent members common to those of the first embodiment are denoted by the same reference symbols, and a detailed description thereof will be omitted. Here, the printing device 1B of the present embodiment has the same configuration as the printing device 1A of the first embodiment except for the configuration of the drying furnace 10. For this reason, the printing device 1B of the present embodiment has the same features as those of the printing device 1A of the first embodiment, except for the portion described below.

As shown in FIG. 3, the printing device 1B of the present embodiment includes a contact heating section 21 that heats the printing medium P by contacting an opposite surface P2, which is a surface opposite to the image forming surface P1 of the printing medium P. For this reason, the printing device 1B of the present embodiment can heat the printing medium P from the opposite surface P2, and it is possible to particularly effectively dry the ink that is ejected onto the image forming surface P1 while suppressing a change in the surface condition of the printing medium P. Note that by heating the printing medium P from the opposite surface P2 by the contact heating section 21, it is possible to suppress a change in the surface condition of the printing medium P, such as gloss unevenness, and to increase drying efficiency.

Specifically, the printing device 1B of the present embodiment has the first drying furnace 10A and the second drying furnace 10B as the drying furnace 10, and has a first contact heating section 21A and a second contact heating section 21B as the contact heating section 21, in which the first contact heating section 21A is provided in the first drying furnace 10A and the second contact heating section 21B is provided in the second drying furnace 10B. In other words, the second contact heating section 21B is disposed downstream of the first contact heating section 21A in the transport direction A. Note that as the contact heating section 21, for example, a metal plate on which nichrome wiring or the like is disposed can be used.

Here, the printing device 1B of the present embodiment also has the first mode and the second mode as the print mode for forming images on the printing medium P. An example of a printing method performed using the printing device 1B of the present embodiment including a specific example of setting the print mode will be described below with reference to the flowchart of FIG. 4.

Figure 4:
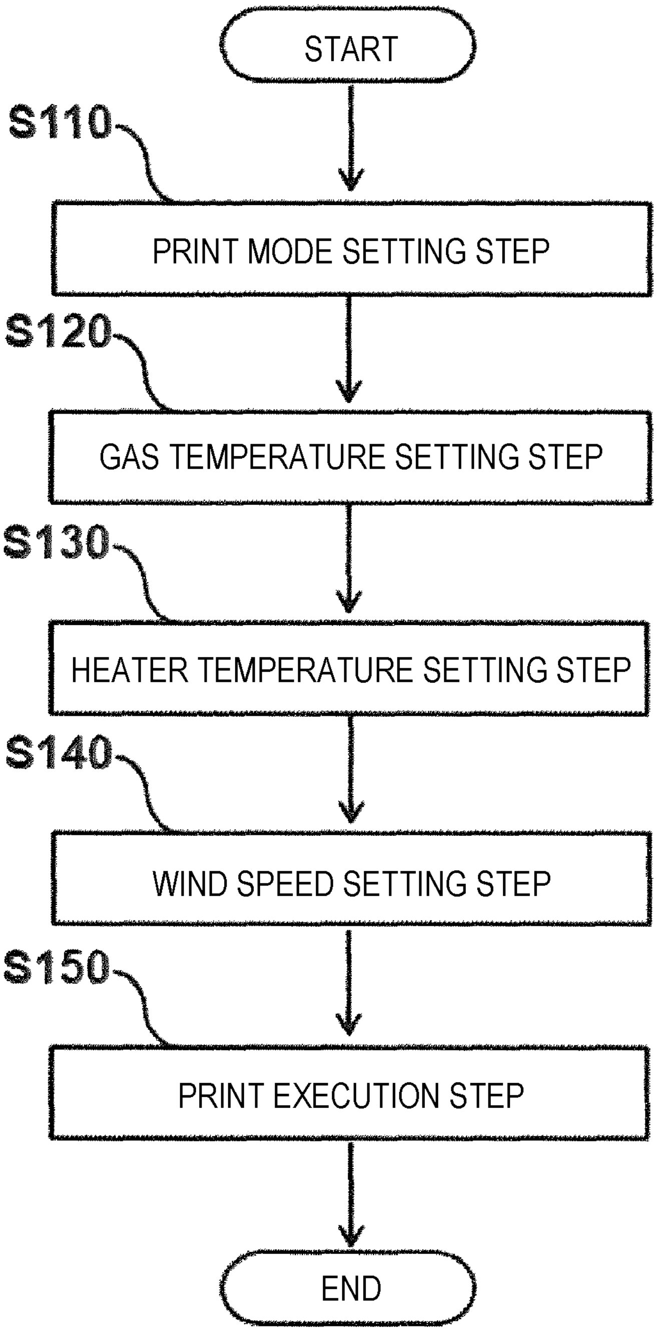
FIG. 4 is a flow chart of an example of a printing method performed using the printing device of FIG. 3.

The print mode setting step of step S110 in FIG. 4 is the same as the print mode setting step of step S110 in FIG. 2. That is, the print mode is set corresponding to Table 1. In the gas temperature setting step of step S120, when the print mode is set to the first mode in the print mode setting step of step S110, the temperature of gas G blown by the blowing heating section 20 is set to 75° C. in both the first blowing heating section 20A and the second blowing heating section 20B. Also when the print mode is set to the second mode in the print mode setting step of step S110, the temperature of gas G blown by the blowing heating section 20 is set to 75° C. in both the first blowing heating section 20A and the second blowing heating section 20B.

Next, in the heater temperature setting step of step S130, the temperature of the heater provided in the contact heating section 21 is set. Here, in the printing method of the present embodiment, when the print mode is set to the first mode in the print mode setting step of step S110, the temperature of the heater is set to 75° C. in both the first contact heating section 21A and the second contact heating section 21B. Also when the print mode is set to the second mode in the print mode setting step of step S110, the temperature of the heater is set to 75° C. in both the first contact heating section 21A and the second contact heating section 21B.

Next, in the airflow speed setting step of step S140, when the print mode is set to the first mode in the print mode setting step of step S110, the airflow speed of gas G blown by the blowing heating section 20 is set to 10 m/s in both the first blowing heating section 20A and the second blowing heating section 20B. On the other hand, when the print mode is set to the second mode in the print mode setting step of step S110, the airflow speed of gas G blown by the blowing heating section 20 is set to 5 m/s in the first blowing heating section 20A, and is set to 20 m/s in the second blowing heating section 20B.

Here, the gas temperature setting step of Step S120, the heater temperature setting step of step S130, and the airflow speed setting step of step S140 do not have to be performed in the order of the flowchart of FIG. 4, but may be performed in a different order or may be performed simultaneously. Note that in the present embodiment, the items set in the gas temperature setting step of step S120, the heater temperature setting step of step S130, and the airflow speed setting step of step S140 are summarized as shown in Table 4 below.

TABLE 4

| PRINT MODE | BLOWING HEATING SECTION | GAS TEMPERATURE (° C.) | AIRFLOW SPEED(m/s) | HEATER TEMPERATURE (° C.) |
|---|---|---|---|---|
| FIRST MODE | FIRST BLOWING HEATING SECTION | 75 | 10 | 75 |
| | SECOND BLOWING HEATING SECTION | 75 | 10 | 75 |
| SECOND MODE | FIRST BLOWING HEATING SECTION | 75 | 5 | 75 |
| | SECOND BLOWING HEATING SECTION | 75 | 20 | 75 |

Next, in the printing execution step of step S150, the print medium P is transported in the transport direction A and ink is ejected from the print head 3 to form a desired image on the image forming surface P1. Then, the desired image is formed on the image forming surface P1, and the printing method of the present embodiment is ended.

Note that in the printing device 1B of the present embodiment, the gas temperature, the heater temperature, and the airflow speed can be set under conditions different from those of Table 4 in the gas temperature setting step of step S120, the heater temperature setting step of step S130, and the airflow speed setting step of step S140. The respective items set under the conditions of an example different from Table 4 are summarized, for example, as shown in Table 5 below. The conditions in Table 5 are such that in the second mode the airflow speed of the second blowing heating section 20B is not increased with respect to the first mode, but rather the gas temperature of the second blowing heating section 20B and the heater temperature of the second contact heating section 21B are increased with respect to the first mode. However, the present invention is not limited to such conditions.

TABLE 5

| PRINT MODE | BLOWING HEATING SECTION | GAS TEMPERATURE (° C.) | AIRFLOW SPEED(m/s) | HEATER TEMPERATURE (° C.) |
|---|---|---|---|---|
| FIRST MODE | FIRST BLOWING HEATING SECTION | 75 | 10 | 75 |
| | SECOND BLOWING HEATING SECTION | 75 | 10 | 75 |
| SECOND MODE | FIRST BLOWING HEATING SECTION | 75 | 5 | 75 |
| | SECOND BLOWING HEATING SECTION | 85 | 10 | 85 |

Third Embodiment

Figure 5:
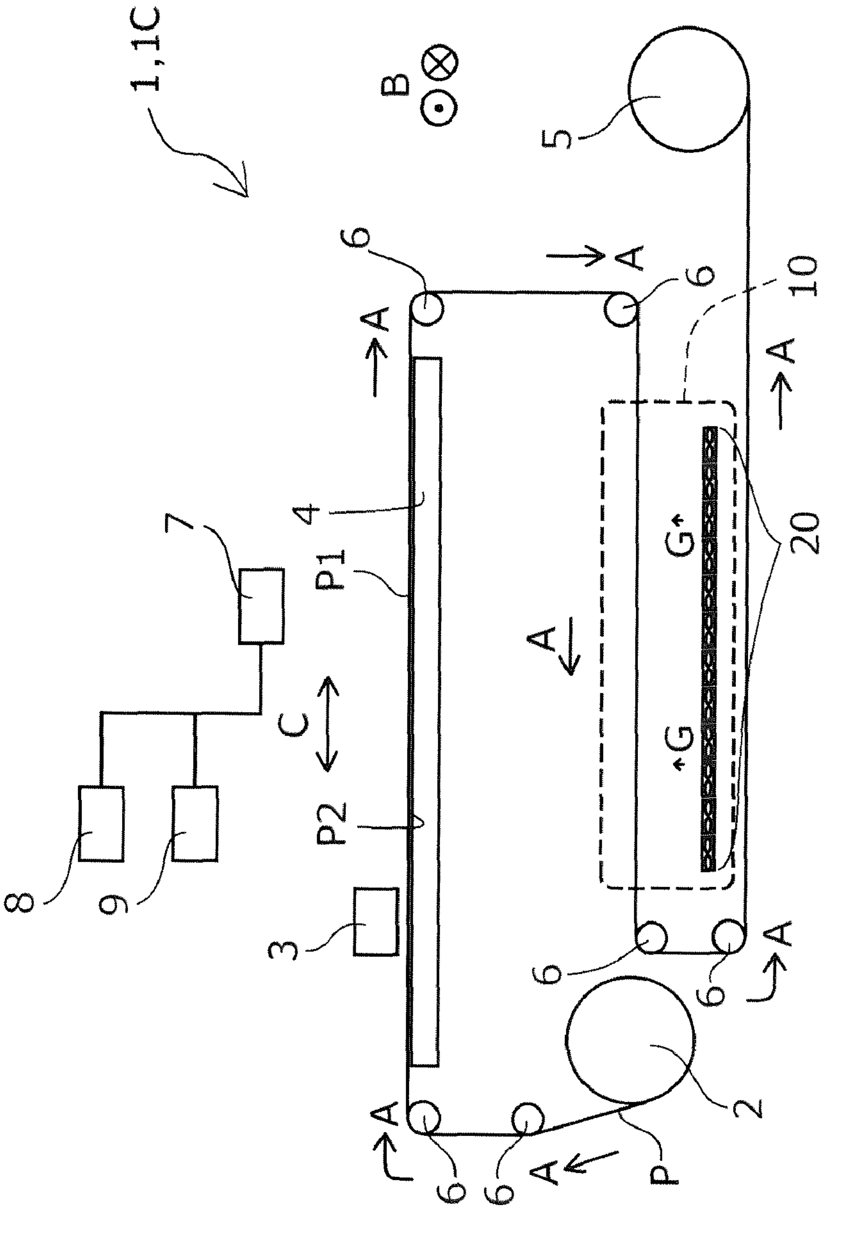
FIG. 5 is a schematic side view of a drying furnace of a printing device according to a third embodiment of the present disclosure.

Next, a printing device 1C according to a third embodiment will be described with reference to FIG. 5. Note that FIG. 5 is a diagram corresponding to FIG. 1 of the printing device 1 in the first embodiment. In FIG. 5, constituent members common to those of the first embodiment and the second embodiment are denoted by the same reference symbols, and detailed description thereof will be omitted.

Here, the configuration of the printing device 1C of the present embodiment other than the configuration of the drying furnace 10 is the same as the configuration of the printing device 1 of the first embodiment and the second embodiment except for the configuration of the transport path of the printing medium P. For this reason, the printing device 1C of the present embodiment has the same features as those of the printing device 1 of the first embodiment and the second embodiment, except for the portion described below.

As described above, the printing device 1 of the first embodiment and the second embodiment has the drying furnace 10, which can be divided into two (a plurality of) sections of the first drying furnace 10A on the upstream side in the transport direction A and the second drying furnace 10B on the downstream side in the transport direction A. On the other hand, the printing device 1C of the present embodiment has only one drying furnace 10. In detail, the printing device 1C according to the present embodiment includes the setting section 2 that sets the roll-like print medium P, the winding section 5 that winds the print medium P transported from the setting section 2, the print head 3 that forms the image by ejecting ink onto the image forming surface P1 of the transported print medium P, and one drying furnace 10 that is disposed downstream of the print head 3 in the transport direction A in the transport path of the print medium P and that dries the ink ejected onto the print medium P.

Here, as shown in FIG. 5, the drying furnace 10 has one blowing heating section 20 that blows heated gas G to the image forming surface P1. In addition, similarly to the printing device 1 of the first embodiment and the second embodiment, it has the first mode and the second mode as the print mode. Here, in the printing device 1C of the present embodiment, the airflow speed of gas G blown by the blowing heating section 20 in the second mode can be slower than the airflow speed of gas G blown by the blowing heating section 20 in the first mode, and the temperature of gas G blown by the blowing heating section 20 in the second mode can be higher than the temperature of gas G blown by the blowing heating section 20 in the first mode (for details, refer to Table 6 to be described later). In this manner, by decreasing the airflow speed of gas G to be blown and decreasing the temperature of gas G to be blown, it is possible to reduce the unevenness of the drying speed of the ink even when there are both portions directly and indirectly hit by gas G. For this reason, in the printing device 1C of the present embodiment, by selecting the second mode in a case of using the printing medium P of which the surface condition easily changes, it is possible to suppress the occurrence of unevenness in the glossiness of the image forming surface P1, and it is possible to suppress the surface condition of the printing medium P from changing. In the second mode, it is possible to sufficiently dry the print medium P as a whole by increasing the drying efficiency by increasing the temperature of gas G blown by the blowing heating section 20.

Note that the printing device 1C of the present embodiment can execute the printing method according to the flowchart shown in FIG. 2, similarly to the printing device 1A of the first embodiment. The setting conditions of the print mode in this case are the same as those shown in Table 1, and the drying conditions are in accordance with Table 6 below.

TABLE 6

| PRINT MODE | GAS TEMPERATURE(° C.) | AIRFLOW SPEED(m/s) |
|---|---|---|
| FIRST MODE | 95 | 10 |
| SECOND MODE | 105 | 5 |

Fourth Embodiment

Figure 6:
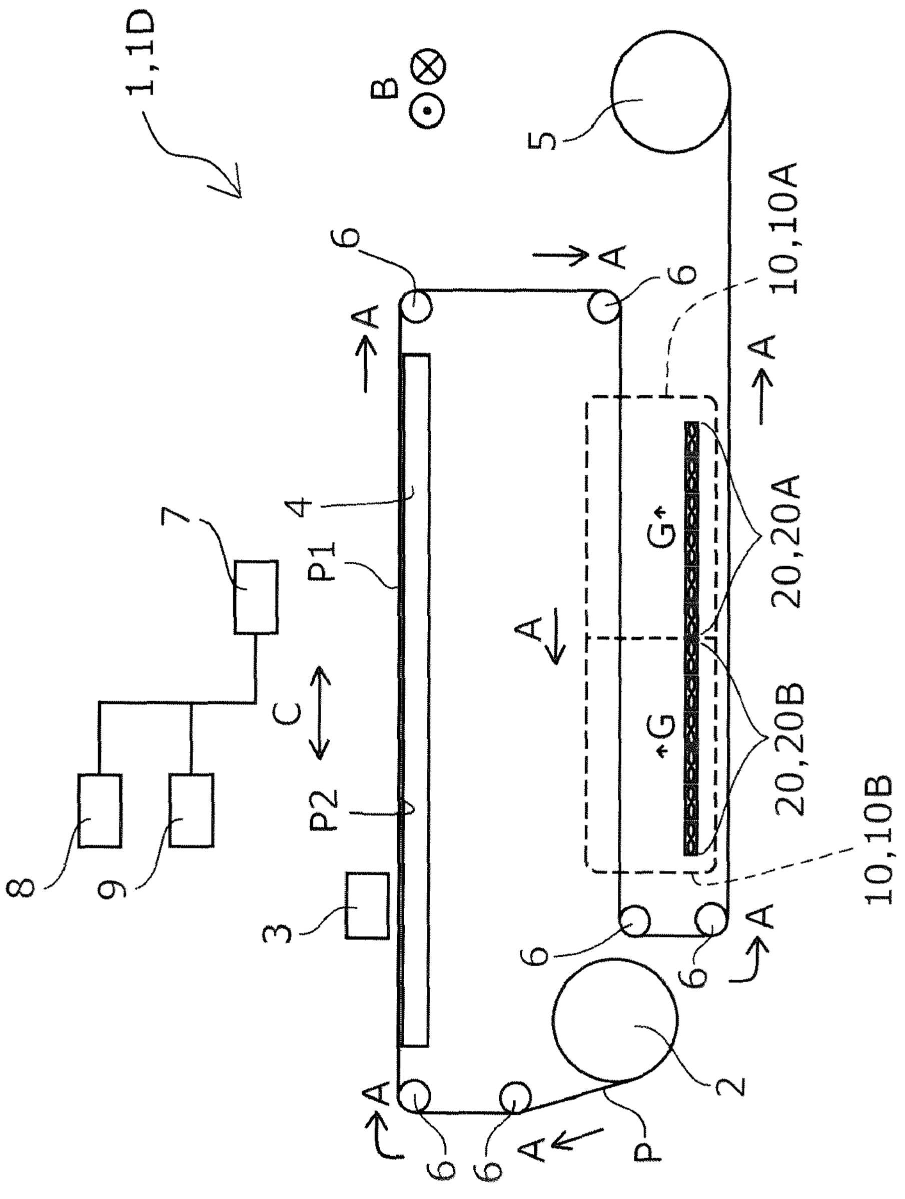
FIG. 6 is a schematic side view of a drying furnace of a printing device according to a fourth embodiment of the present disclosure.

Next, a printing device 1D according to a fourth embodiment will be described with reference to FIG. 6. Note that FIG. 6 is a diagram corresponding to FIG. 1 of the printing device 1 in the first embodiment. In FIG. 6, constituent members common to those of the first embodiment to the third embodiment are denoted by the same reference symbols, and a detailed description thereof will be omitted. Here, the printing device 1D of the present embodiment has the same configuration as the printing device 1 of the third embodiment except for the configuration of the drying furnace 10, and other than the configuration of the drying furnace 10 is the same as the configuration of the printing device 1 of the first embodiment and the second embodiment except for the configuration of the transport path of the printing medium P. For this reason, the printing device 1D of the present embodiment has the same features as those of the printing device 1 of the first embodiment to the third embodiment, except for the portion described below.

As shown in FIG. 6, the printing device 1D of the present embodiment can be expressed as having the first drying furnace 10A and the second drying furnace 10B as the drying furnace 10, and having the first blowing heating section 20A and the second blowing heating section 20B as the blowing heating section 20, by dividing the blowing heating section 20 into two sections and making it driveable with respect to the printing device 1C of the third embodiment. It can also be expressed as a configuration in which the arrangement of the first drying furnace 10A and the second drying furnace 10B is different with respect to the printing device 1A of the first embodiment. The printing device 1D of the present embodiment can execute the printing method according to the flowchart shown in FIG. 2 under exactly the same drying conditions as the printing device 1A of the first embodiment shown in Table 1 to Table 3 and the like.

Fifth Embodiment

Figure 7:
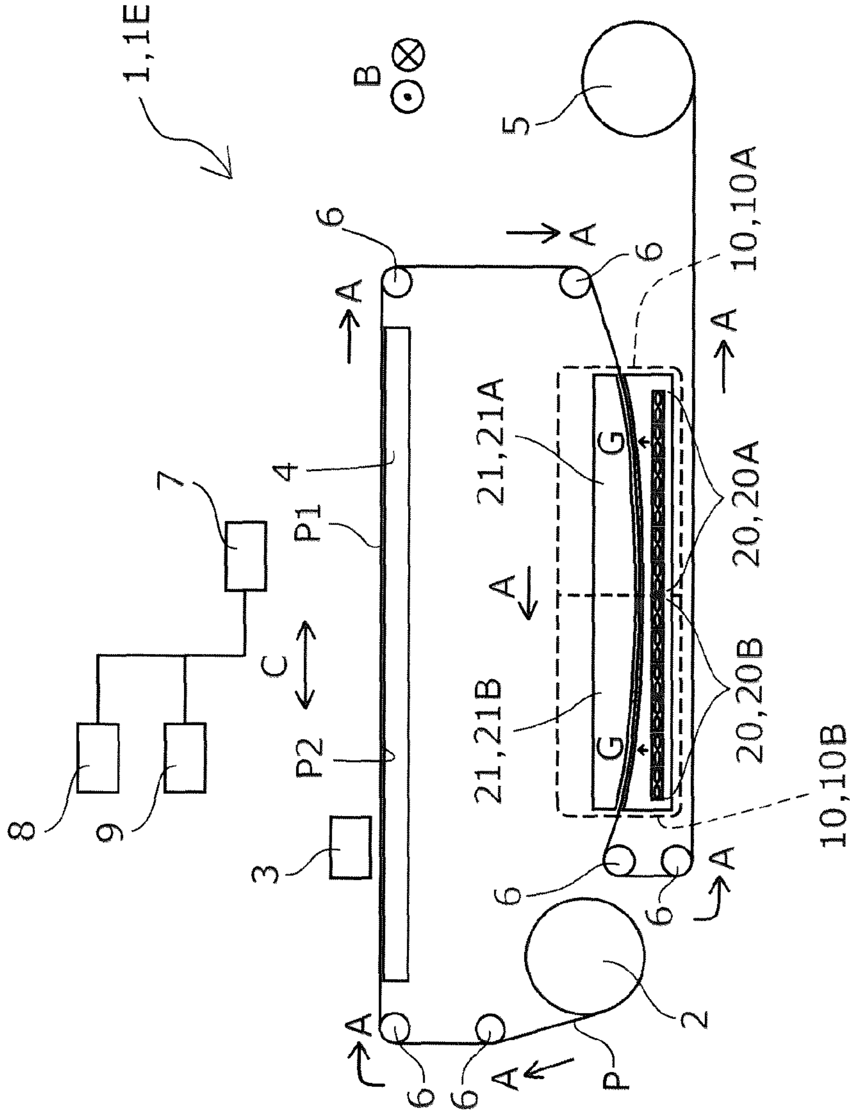
FIG. 7 is a schematic side view of a drying furnace of a printing device according to a fifth embodiment of the present disclosure.

Next, a printing device 1E according to a fifth embodiment will be described with reference to FIG. 7. Note that FIG. 7 is a diagram corresponding to FIG. 1 of the printing device 1 in the first embodiment. In FIG. 7, constituent members common to those of the first embodiment to the fourth embodiment are denoted by the same reference symbols, and a detailed description thereof will be omitted. Here, the configuration of the printing device 1E of the present embodiment other than the configuration of the drying furnace 10 is the same as the configuration of the printing device 1 of the first embodiment to the forth embodiment except for the configuration of the transport path of the printing medium P. For this reason, the printing device 1E of the present embodiment has the same features as those of the printing devices 1 of the first embodiment to the fourth embodiment, except for the portion described below.

As shown in FIG. 7, the printing device 1E of the present embodiment has the first drying furnace 10A and the second drying furnace 10B as the drying furnace 10, the first blowing heating section 20A and the second blowing heating section 20B as the blowing heating section 20, and the first contact heating section 21A and the second contact heating section 21B as the contact heating section 21. That is, the printing device 1E of the present embodiment can be expressed as a configuration different from the printing device 1B of the second embodiment in the arrangement of the first drying furnace 10A and the second drying furnace 10B. The printing device 1E of the present embodiment can execute the printing method according to the flowchart shown in FIG. 4 under exactly the same drying conditions as the printing device 1B of the second embodiment shown in Table 1, Table 4, Table 5, and the like.

The present disclosure is not limited to the above described embodiments and can be realized by various configurations without departing from the scope of the present disclosure. For example, the technical features in the present embodiments corresponding to the technical features in the respective aspects described in the summary of the present disclosure can be appropriately replaced or combined in order to solve some or all of the above described problems or in order to achieve some or all of the above described effects. If a technical feature is not described as an essential feature in the present specification, the technical feature can be deleted as appropriate.

What is claimed is:

1. A printing device comprising:
- a setting section configured to set a roll-like print medium;
- a winding section configured to wind up the print medium transported from the setting section;
- a print head configured to form an image by ejecting ink onto an image forming surface of the transported print medium;
- a control section; and
- a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section, which is disposed downstream of the first blowing heating section in the transport direction, a print mode for forming the image on the print medium includes a first mode and a second mode, and the control section is configured to set the airflow speed of gas blown by the first blowing heating section in the second mode to be slower than the airflow speed of gas blown by the first blowing heating section in the first mode.

2. The printing device of claim 1, wherein the control section is configured to set the airflow speed of gas blown by the second blowing heating section in the second mode is faster than the airflow speed of gas blown by the first blowing heating section in the second mode.

3. The printing device according to claim 2, wherein the control section is configured to set the airflow speed of gas blown by the second blowing heating section in the second mode is faster than the airflow speed of gas blown by the second blowing heating section in the first mode.

4. The printing device according to claim 2, wherein the control section is configured to set the temperature of gas blown by the second blowing heating section in the second mode is higher than the temperature of gas blown by the second blowing heating section in the first mode.

5. The printing device according to claim 1, further comprising:

a storage section configured to store a table of print modes corresponding to combinations of amounts of ink to be used and types of print medium to be used;

an input section configured to enable input of the amount of ink to be used and the type of print medium to be used; and a print mode setting section configured to set the print mode based on the table in accordance with information input from the input section.

6. The printing device according to claim 5, wherein the print mode setting section is configured to, when the amount of ink to be used is less than 8.0 mg/inch2, set the print mode to the first mode regardless of the type of print medium to be used.

7. The printing device according to claim 5, wherein the print mode setting section is configured to, when the amount of ink to be used is equal to or greater than 10.0 mg/inch2, set the print mode to the second mode regardless of the type of print medium to be used.

8. The printing device according to claim 5, wherein the print mode setting section is configured to, when the amount of ink to be used is less than 8.0 mg/inch2 and equal to or greater than 10.0 mg/inch2, set the print mode to the first mode when the material of the image forming surface of the print medium to be used is paper and set the print mode to second mode when the material of the image forming surface of the print medium to be used is a film.

9. The printing device according to claim 1, further comprising:

a contact heating section configured to heat the print medium by contacting a surface of the print medium opposite to the image forming surface.

10. A printing device comprising:

a setting section configured to set a roll-like print medium;

a winding section configured to wind up the print medium transported from the setting section;

a print head configured to form an image by ejecting ink onto an image forming surface of the transported print medium;

a control section; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, a print mode for forming the image on the print medium includes a first mode and a second mode, the control section is configured to set the airflow speed of gas blown by the blowing heating section in the second mode to be lower than the airflow speed of gas blown by the blowing heating section in the first mode, and the control section is configured to set the temperature of gas blown by the blowing heating section in the second mode to be higher than the temperature of gas blown by the blowing heating section in the first mode.

11. A printing method of a printing device, the printing device including a setting section configured to set a roll-like print medium;

a winding section configured to wind up the print medium transported from the setting section;

a print head configured to form an image by ejecting ink onto an image forming surface of the transported print medium; and a drying furnace that is disposed downstream of the print head in a transport direction of the print medium in a transport path of the print medium and that is configured to dry the ink ejected onto the print medium, wherein the drying furnace includes a blowing heating section configured to blow heated gas to the image forming surface, the blowing heating section includes a first blowing heating section and a second blowing heating section, which is disposed downstream of the first blowing heating section in the transport direction, and a print mode for forming the image on the print medium includes a first mode and a second mode, the method comprising:

making the airflow speed of gas blown by the first blowing heating section in the second mode to be slower than the airflow speed of gas blown by the first blowing heating section in the first mode.

* * * * *